(12) United States Patent
Dickman

(10) Patent No.: US 11,492,850 B2
(45) Date of Patent: Nov. 8, 2022

(54) LADDER SPREADER

(71) Applicant: John E. Dickman, Flowery Branch, GA (US)

(72) Inventor: John E. Dickman, Flowery Branch, GA (US)

( * ) Notice: Subject to any disclaimer, the term of this patent is extended or adjusted under 35 U.S.C. 154(b) by 0 days.

(21) Appl. No.: 17/571,306

(22) Filed: Jan. 7, 2022

(65) Prior Publication Data

US 2022/0213732 A1    Jul. 7, 2022

Related U.S. Application Data

(60) Provisional application No. 63/134,868, filed on Jan. 7, 2021.

(51) Int. Cl.
| | |
|---|---|
| *E06C 7/50* | (2006.01) |
| *E06C 5/24* | (2006.01) |
| *B60R 9/048* | (2006.01) |
| *E06C 1/20* | (2006.01) |

(52) U.S. Cl.
CPC .............. *E06C 7/50* (2013.01); *B60R 9/0485* (2013.01); *E06C 1/20* (2013.01); *E06C 5/24* (2013.01)

(58) Field of Classification Search
CPC ..... E06C 7/50; E06C 1/14; E06C 1/20; E06C 5/24; B60R 9/0485; E05C 17/16; E05C 17/24; E05C 17/28
See application file for complete search history.

(56) References Cited

U.S. PATENT DOCUMENTS

| | | | | |
|---|---|---|---|---|
| 149,909 | A * | 4/1874 | Barnard ................... | E06C 1/20 182/162 |
| 438,459 | A * | 10/1890 | Wing ....................... | E06C 1/20 182/175 |
| 722,864 | A * | 3/1903 | Lorenz .................... | E06C 1/20 182/175 |
| 958,732 | A * | 5/1910 | Dennis .................... | E06C 1/20 182/162 |
| 992,915 | A * | 5/1911 | Shaw ....................... | E06C 1/22 182/167 |

(Continued)

FOREIGN PATENT DOCUMENTS

FR    1265972 A    7/1961

OTHER PUBLICATIONS

"International Search Report and Written Opinion issued in PCT International Application No. PCT/US2022/011719 filed Jan. 7, 2022", dated Mar. 21, 2022, 15 pages.

*Primary Examiner* — Daniel P Cahn
*Assistant Examiner* — Shiref M Mekhaeil
(74) *Attorney, Agent, or Firm* — Johnson, Marcou, Isaacs & Nix, LLC

(57) ABSTRACT

A ladder comprises a front leg and a rear leg connected by a slider bracket. The slider bracket comprises a base and a track. The base comprises an aperture therein. The track extends away from the base and comprises a slot therein. The base is rotatably coupled to the front leg by a front pin in the aperture. The track is slidably coupled to the rear leg by a rear pin in the slot. When spreading the rear leg away from the front leg, the base pivots around the front pin as the rear pin slides in the slot of the track until the rear pin reaches the end of the slot in the track. The slot also may include a latch at the end of the slot that engages the rear pin.

21 Claims, 10 Drawing Sheets

(56) References Cited

U.S. PATENT DOCUMENTS

| | | | | |
|---|---|---|---|---|
| 1,323,227 | A * | 11/1919 | Kirby | E06C 1/20 |
| | | | | 182/201 |
| 1,563,606 | A * | 12/1925 | Williams | E05C 17/16 |
| | | | | 24/115 R |
| 1,597,943 | A * | 8/1926 | Wilhelm | E05C 17/16 |
| | | | | 296/96.2 |
| 1,753,542 | A * | 4/1930 | Welna | E05C 17/16 |
| | | | | 292/276 |
| 1,767,463 | A * | 6/1930 | Ledwinka | E05C 17/16 |
| | | | | 296/96.2 |
| 2,076,860 | A * | 4/1937 | North | E05C 17/085 |
| | | | | 217/60 C |
| 2,208,266 | A * | 7/1940 | Meier | E06C 1/16 |
| | | | | 182/176 |
| 2,230,015 | A * | 1/1941 | Rich | E06C 1/387 |
| | | | | 182/176 |
| 2,299,584 | A * | 10/1942 | Low | E06C 1/32 |
| | | | | 182/24 |
| 2,325,793 | A | 8/1943 | William | |
| 2,369,136 | A * | 2/1945 | Chambers | E05C 17/166 |
| | | | | 292/268 |
| 2,587,200 | A * | 2/1952 | Nottingham | E05C 17/24 |
| | | | | 217/60 C |
| 2,801,871 | A * | 8/1957 | Radcliffe | E05C 17/166 |
| | | | | 292/267 |
| 2,811,273 | A * | 10/1957 | Holmes | E05C 17/24 |
| | | | | 292/DIG. 43 |
| 2,873,470 | A * | 2/1959 | De Dona | E05C 17/16 |
| | | | | 16/360 |
| 2,960,181 | A | 11/1960 | John | |
| 3,064,990 | A | 11/1962 | Salvucci | |
| 3,502,175 | A * | 3/1970 | Bullock | E06C 7/06 |
| | | | | 182/211 |
| 6,048,018 | A * | 4/2000 | Shambeau | B62D 33/03 |
| | | | | 296/57.1 |
| 6,247,804 | B1 | 6/2001 | Watanabe | |
| 6,986,405 | B2 | 1/2006 | Meeker | |
| 7,108,103 | B2 | 9/2006 | Meeker | |
| 7,370,727 | B2 | 5/2008 | Meeker | |
| 7,494,195 | B2 * | 2/2009 | Han | H05K 7/1489 |
| | | | | 312/328 |
| 8,341,806 | B2 * | 1/2013 | Parker | A47C 12/00 |
| | | | | 16/349 |
| 8,701,831 | B2 * | 4/2014 | Moss | E06C 1/393 |
| | | | | 182/174 |
| 8,997,931 | B2 * | 4/2015 | Parker | E06C 1/387 |
| | | | | 182/180.1 |
| 10,100,575 | B1 * | 10/2018 | Neubauer | E06C 7/50 |
| 10,711,519 | B2 * | 7/2020 | Neubauer | E06C 7/183 |
| D899,628 | S * | 10/2020 | Moncada | D25/64 |
| 10,954,704 | B2 * | 3/2021 | Kroening | E05C 17/16 |
| 11,105,152 | B1 | 8/2021 | Joldersma | |
| 11,131,142 | B2 * | 9/2021 | Dings | B29C 39/003 |
| 11,187,039 | B2 * | 11/2021 | Moreno Moncada | E06C 1/14 |
| 2006/0102425 | A1 * | 5/2006 | Moldthan | E06C 1/393 |
| | | | | 182/129 |
| 2011/0024234 | A1 * | 2/2011 | Lin | E06C 1/387 |
| | | | | 182/161 |
| 2012/0211305 | A1 * | 8/2012 | Moss | E06C 1/397 |
| | | | | 182/180.1 |
| 2013/0145695 | A1 * | 6/2013 | Wach | E05B 17/0041 |
| | | | | 49/381 |
| 2014/0041965 | A1 * | 2/2014 | Hess | E06C 7/48 |
| | | | | 29/428 |
| 2017/0328131 | A1 * | 11/2017 | Woodward | E06C 1/393 |
| 2018/0170272 | A1 | 6/2018 | Bleazard | |
| 2018/0171714 | A1 * | 6/2018 | Dings | E06C 1/383 |
| 2020/0048962 | A1 * | 2/2020 | Moreno Moncada | E06C 1/393 |
| 2020/0240209 | A1 * | 7/2020 | Zhu | E06C 1/22 |
| 2021/0246725 | A1 * | 8/2021 | Wernberg | E06C 7/48 |

* cited by examiner

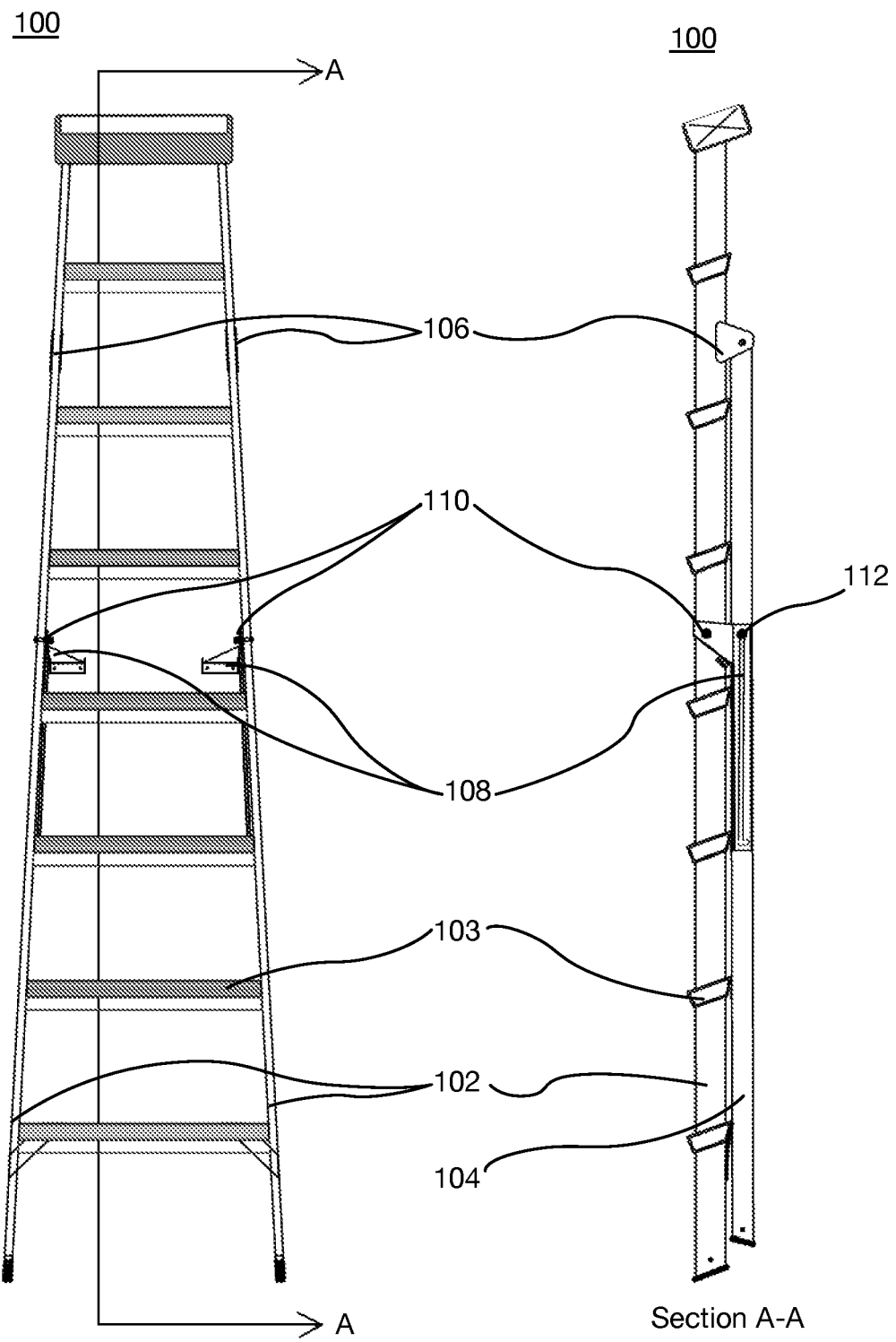

LADDER SPREADER

CROSS REFERENCE TO RELATED APPLICATIONS

This application claims priority to U.S. Provisional Patent Application No. 63/134,868 filed Jan. 7, 2021 and titled "Ladder for Recreational Vehicles, Spreader for Step Ladder, and Ladder Components." The entire contents of the above-identified priority application are hereby fully incorporated herein by reference.

TECHNICAL FIELD

The technology disclosed herein relates to step/foldable ladders, and, more particularly, to a spreader that allows the legs of the ladder to spread and collapse and that holds the legs of the ladder in the spread and collapsed configurations.

BACKGROUND

Conventional step ladders include foldable spreaders that fold to collapse when moving the legs of the step ladder together for storage. These foldable spreaders also unfold when moving the legs of the step ladder apart to use the step ladder. Conventional foldable spreaders for a step ladder have several deficiencies. For example, the foldable spreaders do not assist in holding the legs together in the collapsed position. Accordingly, when carrying a folded step ladder, the user must hold the legs together to prevent the legs from deploying. Conventional spreaders also do not assist with opening of the legs of the step ladder. The user must manually push the step ladder legs apart to unfold the spreader to the position that supports the triangular shape of the step ladder. Additionally, the user typically must also push down on the hinge of the foldable spreader to completely unfold the spreader to allow safe use of the step ladder. Conventional spreaders also do not assist with folding the legs of the step ladder from the open position to the closed position. To close a conventional step ladder, the user must push up on both spreaders to break the closed hinge position. Then, the user must grab both sets of legs to push the two sets of legs together. Operation of foldable spreaders to open/close a conventional step ladder also creates pinch points that may pinch the user's fingers.

BRIEF DESCRIPTION OF THE DRAWINGS

FIG. 2A is a front view of the step ladder comprising slider spreaders in a closed position.

FIG. 2B is a cross-sectional view of the closed step ladder of FIG. 2A as viewed along the cut line C-C in FIG. 2A.

DETAILED DESCRIPTION

A step ladder is a type of ladder having two legs. The two legs are connected at a hinge point and fold together via the hinge point for storage of the step ladder. The two legs also spread apart via the hinge point to create an "A-frame" type of structure to support the open ladder. A step ladder is sometimes called a "foldable ladder."

The innovations described herein relate to slidable or "slider" spreaders for step ladders. Slider spreaders for step ladders according to various aspects of the technology discussed herein will now be described with reference to the Figures.

Figure 1A:
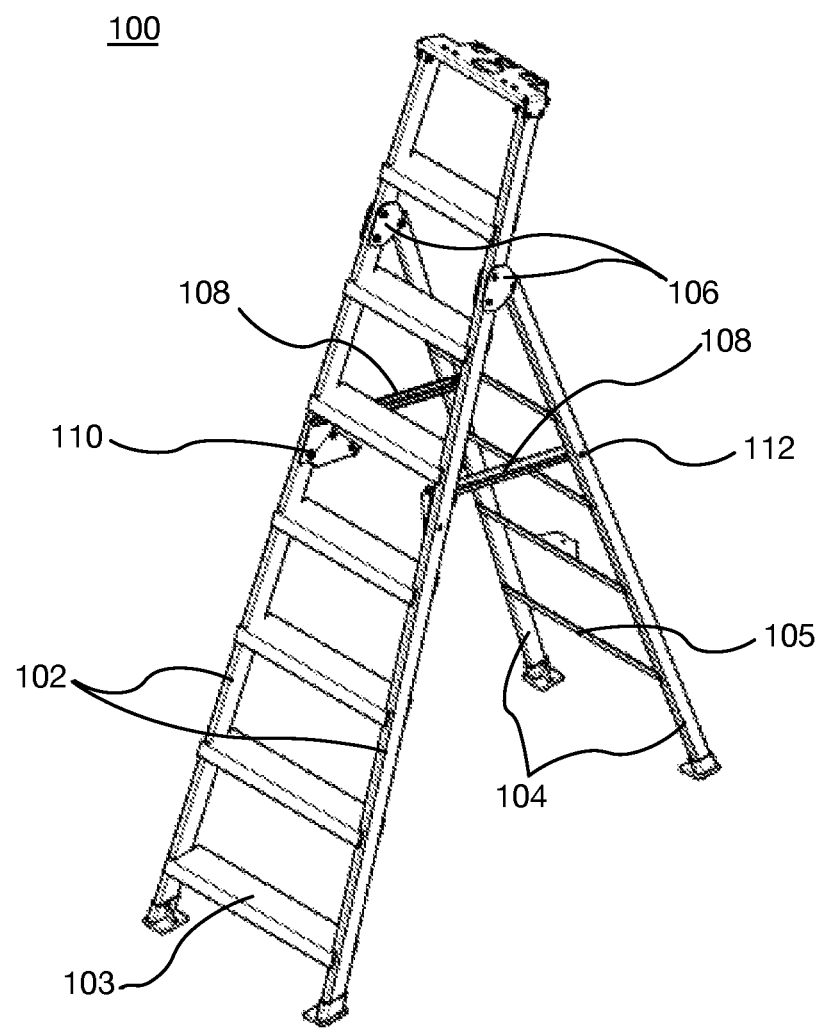
FIG. 1A is a front perspective view of the step ladder comprising slider spreaders in an open position.
Figure 1B:
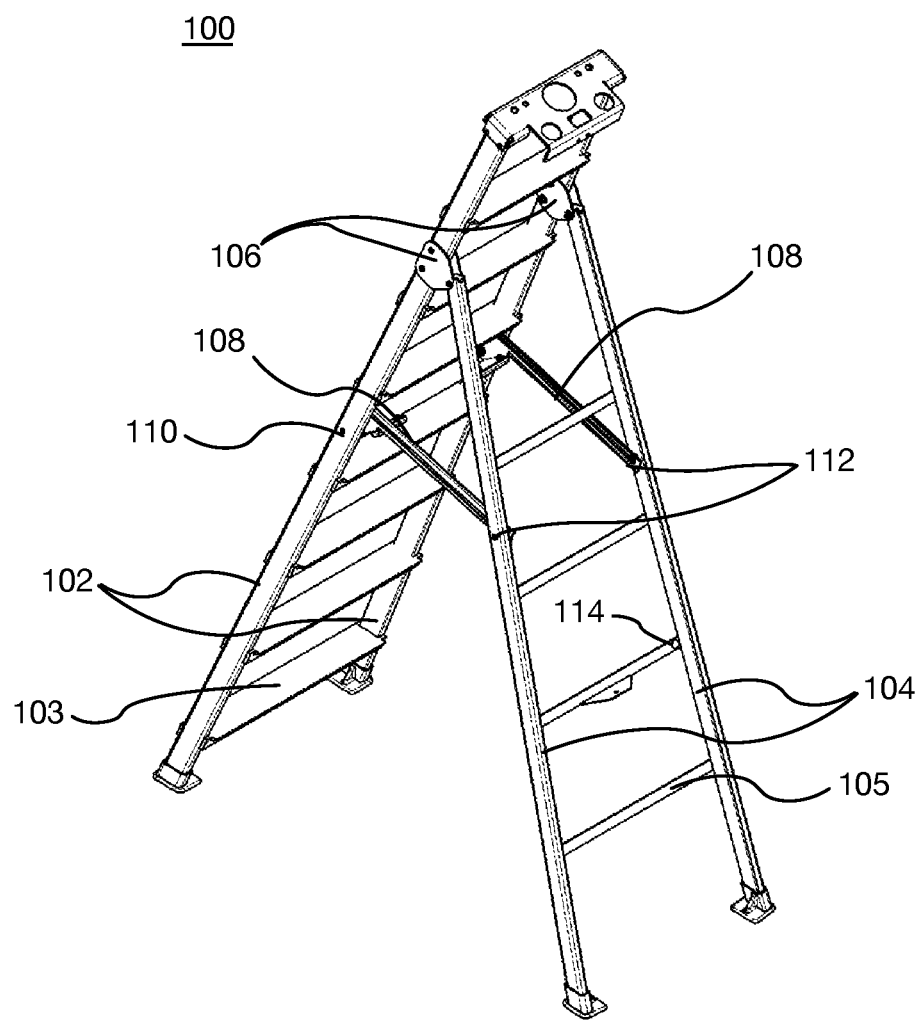
FIG. 1B is a rear perspective view of the open step ladder of FIG. 1A.

FIGS. 1A, 1B, 2A, and 2B depict a step ladder 100 comprising slider spreaders 108. FIG. 1A is a front perspective view of the step ladder 100 in an open position and showing the slider spreaders 108 in the open position. FIG. 1B is a rear perspective view of the open step ladder 100 comprising the slider spreaders 108. FIG. 2A is a front leg view of the step ladder 100 in a closed position and showing the slider spreaders 108 in the closed position. FIG. 2B is a cross-sectional view of the closed step ladder 100 as viewed along the cut line C-C in FIG. 2A.

As depicted in FIGS. 1A, 1B, 2A, and 2B, the step ladder 100 comprises a pair of front legs 102 and a pair of rear legs 104 coupled together via hinges 106. The hinges 106 allow the rear legs 104 to spread from the front legs 102 as shown in the open configuration depicted in FIGS. 1A and 1B. The hinges 106 also allow the rear legs 104 to collapse toward the front legs 102 as shown in the closed configuration depicted in FIGS. 2A and 2B. The pair of front legs 102 are connected via multiple steps 103. The pair of rear legs 104 are connected via multiple supports 105. Only one step 103 and one support 105 are labeled in the figures. The other steps 103 and supports 105 are easily identified in the figures.

The ladder 100 comprises two slider spreaders 108. A first slider spreader 108 connects one of the front legs 102 to one of the rear legs 104. A second slider spreader 108 connects the other one of the front legs 102 to the other one of the rear legs 104.

Each slider spreader 108 is pivotably connected to one of the front legs 102 via a front attachment mechanism 110 and slidably connected to one of the rear legs 104 via a rear attachment mechanism 112.

Figure 3A:
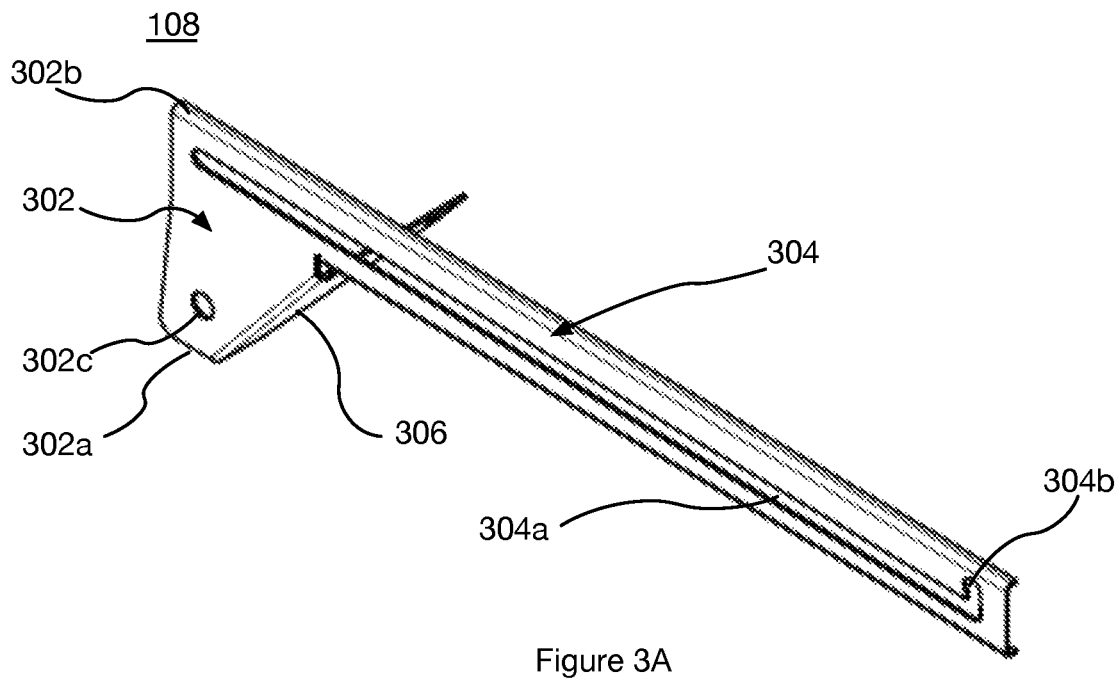
FIGS. 3A and 3B are perspective views of a slider spreader.
Figure 3B:
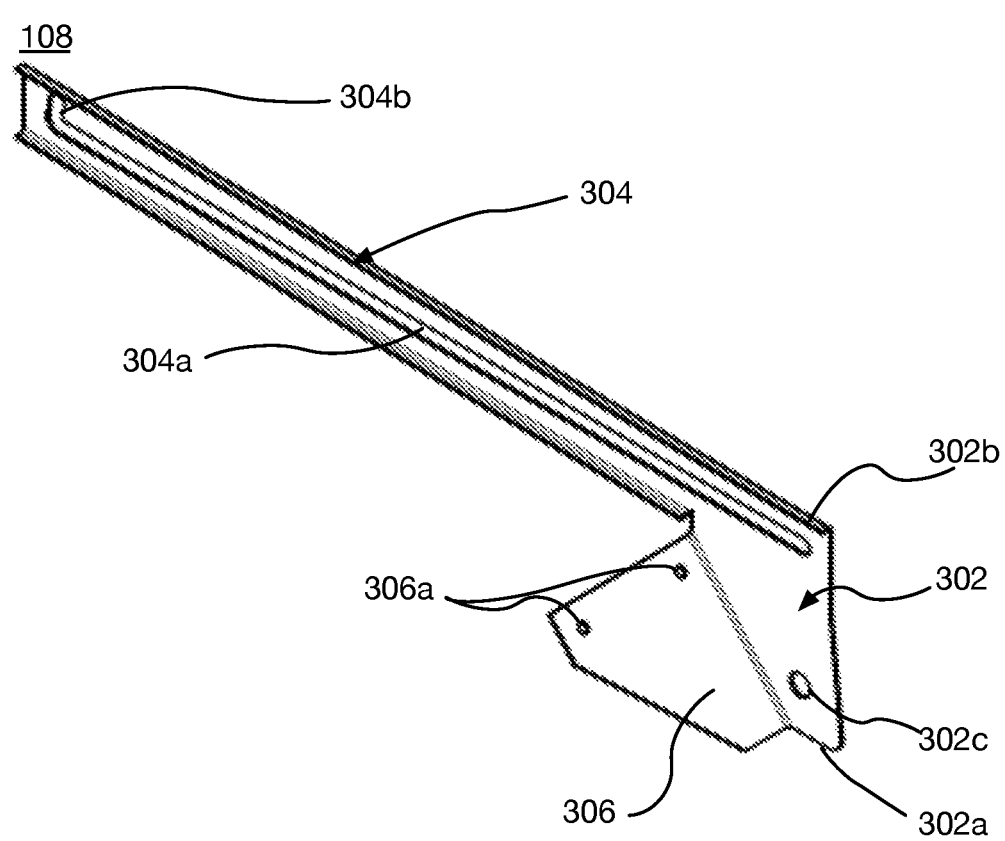
Figure 4A:
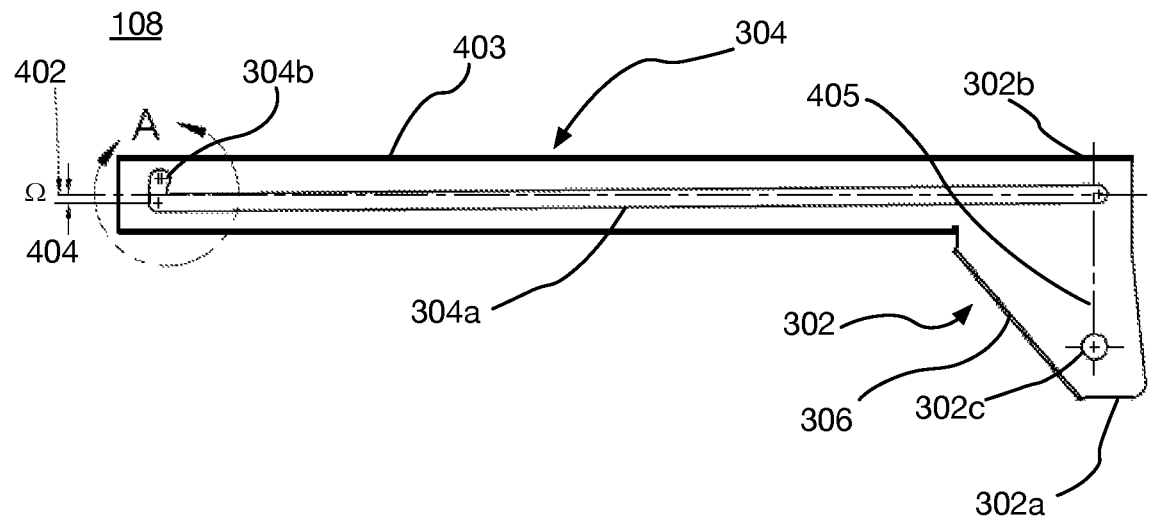
FIG. 4A is a side view of the slider spreader.
Figure 4B:
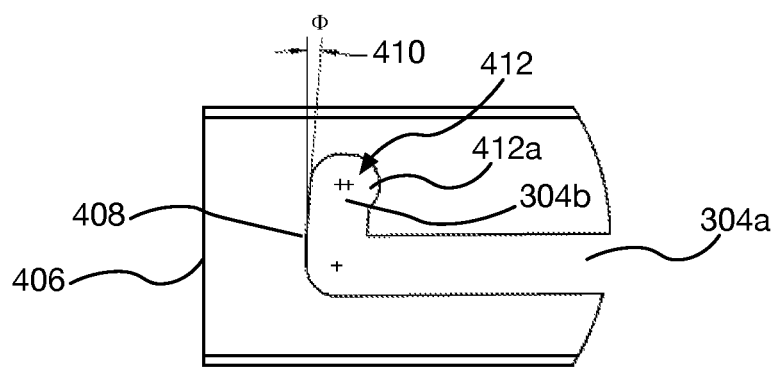
FIG. 4B is a detail view of a portion of the slider spreader as indicated in the detail line A in FIG. 4A.

FIGS. 3A and 3B are perspective views of a slider spreader 108. FIG. 4A is a side view of the slider spreader 108. FIG. 4B is a detail view of a portion of the slider spreader 108 as indicated in the detail line A in FIG. 4A. FIGS. 3A, 3B, 4A, and 4B depict a slider spreader 108 for one side of the legs 102, 104 of the ladder 100. The slider spreader 108 for an opposite side is a mirror image of the slider spreader 108 depicted in the figures.

A slider spreader 108 includes a front elongated portion 302, also referred to as a base, and a rear elongated portion 304, also referred to as a track. The rear elongated portion 304 extends away from the front elongated portion 302. The front elongated portion 302 comprises an aperture 302c therein located toward a front end 302a of the front elongated portion 302. The rear elongated portion 304 comprises a slot 304a that extends along a length of the rear elongated portion 304 and into the front elongated portion 302, at a location in the front elongated portion 302 that is away from the front end 302a of the front elongated portion 302. The slot 304a comprises an optional latching opening 304b disposed at an end of the slot 304a that is opposite the front elongated portion 302. The latching opening 304b extends away from the slot 304a in a direction that is different from the length of the rear elongated portion 304. The slot 304a in the rear elongated portion creates a track along which a pin may slide, as discussed in further detail hereinafter.

Figure 6:
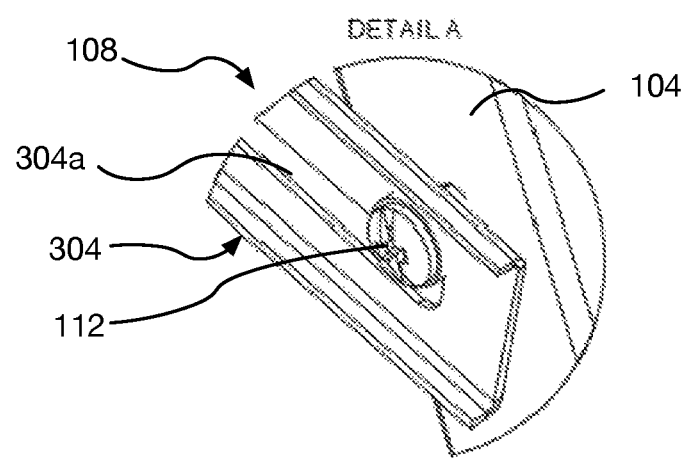
FIG. 6 is a detail view of attachment of the slider spreader to a rear leg of the ladder as indicated in the detail line A in FIG. 1B.

As shown in FIG. 4A, the aperture 302c is positioned on a line 405 that is orthogonal to an edge 403 of the rear elongated portion 304 of the slider spreader 108. The slot 304a of the slider spread 108 may run substantially parallel to the edge 403 of the rear elongated portion 304. As depicted in FIGS. 4A and 4B, a centerline 404 of the slot 304a can be offset from a line 402 that runs parallel to the edge 403 of the rear elongated portion 304 of the slider spreader 108. The distance between lines 402 and 404 in FIG. 4A depicts an amount of this offset, which also provides an offset of the centerline 404 of the slot 304a from being orthogonal to the line 405, as shown by angle $\Omega$ in FIG. 4A. This offset can allow the enlarged washer and shoulder nut head of the attachment mechanism 112 (as shown in FIG. 6) to have room for the larger diameter washer not to hit the flanged edge of slider spreader 108 when in the latched/open position. In this case, the slider spreader flange (above the washer edge) is not resting on the top of the washer but instead rests in the latching opening 304b on the shoulder nut shaft.

The latching opening 304b of the slot 304a may run substantially orthogonal to the slot 304a. As shown in FIG. 4B, the latching opening 304b may run parallel to an edge 406 of the rear elongated portion 304, where the edge 406 runs orthogonal to the line 402 (see FIG. 4A). In this case, the latching opening 304b is offset at an angle $\Phi$ from being orthogonal to line 404 corresponding to the centerline of the slot 304a. When the ladder 102 is in the open position, this offset can allow for the angle of the latching opening 304b of the slider spreader 108 to become vertical to the ground, which can improve the latching and unlatching of slider spreaders 108. Additionally, the latching opening 304b can comprise catch portion 412a being a cutout configured to catch the rear attachment mechanism 112 when the ladder 100 is opened. The catch portion 412a can comprise a cutout radius corresponding to a diameter of the attachment mechanism 112 and offset from a center of the latching opening 304b, as depicted by the line 412.

A handle 306 coupled to the front elongated portion 302 or the rear elongated portion 304 of the slider spreader 108 assists with opening and closing of the legs 102, 103 of the ladder 100. The handle 306 can be integrally formed with the front and/or rear elongated portions 302, 304 (as depicted in FIGS. 3A, 3B, and 4A) or can be a separate component attached to the front and/or rear elongated portions 302, 304. Additionally, a handle extension (not depicted) can be attached to the handle 306 using fasteners through one or more apertures 306a in the handle 306.

The handle 306 may be larger when the slider spreaders 108 are attached on the inside of the front legs 102 of the ladder 100, compared to a smaller size of the handle 306 when the slider spreaders 108 are attached on the outside of the front legs 102 of the ladder 100. Because the handle 306 will protrude outward when the slider spreaders 108 are attached on the exterior of the front legs 102 of the ladder 100, it may be desirable to reduce the size of the handle 306 to reduce the extent of handle protrusion.

Figure 5:
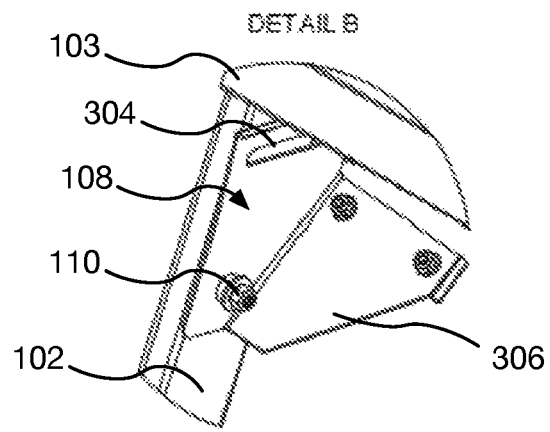
FIG. 5 is a detail view of attachment of a slider spreader to a front leg of a ladder as indicated in the detail line B in FIG. 1A.

FIG. 5 is a detail view of attachment of the slider spreader 108 to the front leg 102 of the ladder 100 as indicated in the detail line B in FIG. 1A. FIG. 6 is a detail view of attachment of the slider spreader 108 to the rear leg 104 of the ladder 100 as indicated in the detail line A in FIG. 1B. A front attachment mechanism 110 is positioned in the aperture 302c of the front elongated portion 302 of the slider spreader 108 and coupled to the front leg 102 of the ladder 100 to pivotably attach the front elongated portion 302a of the slider spreader 108 to the front leg 102 of the ladder 100.

A rear attachment mechanism 112 is positioned in the slot 304a of the rear elongated portion 304 of the slider spreader 108 and coupled to the rear leg 104 of the ladder 100 to slidably attach the rear elongated portion 304 of the slider spreader 108 to the rear leg 104 of the ladder 100.

The front and rear attachment mechanisms 110, 112 can any suitable attachment mechanism that allows the slider spreader 108 to pivot around the front attachment mechanism 110 and to slide around the rear attachment mechanism 112 when coupled to the ladder 100. For example, the front and rear attachment mechanisms 110, 112 can comprise a bolt, washer, and nut combination. The attachment mechanisms 110, 112 also may comprise one or more spacers to prevent binding of the attachment mechanisms 110, 112 with the slider spreader 108. The bolt may insert through the spacer such that the bolt, nut, and washer combination will not bind the attachment mechanism 110, 112. In this case, the spacer of the front attachment mechanism 110 contacts the aperture 302c, and the slider spreader 108 pivots around the spacer. Additionally, the spacer of the rear attachment mechanism 112 contacts the slot 304a and the latching opening 304b, and the slider spreader 108 slides along the spacer. The bolt heads and the nuts retain the slider spreader 108 to the ladder 100. In each case, the attachment mechanisms 110, 112 are inserted through apertures in the legs 102, 104 of the ladder 100 to couple the slider spreaders 108 to the ladder 100. The bolts and/or the spacers may function as a pin around which the aperture of the front elongated portion is rotated and/or over which the slot 304a and latching opening 304b of the rear elongated portion 304 slides.

Any suitable attachment mechanisms may be utilized to allow pivoting of the slider spreader 108 around the front attachment mechanism coupled to the ladder 100 and sliding of the slider spreader 108 along the rear attachment mechanism coupled to the ladder 100.

As depicted in the figures, the slider spreader 108 can be integrally formed from a single piece of material by cutting a desired outline of the slider spreader 108, bending the material to form the front and rear elongated portions 302, 304, drilling the apertures 302c, 306a, and cutting the slot 304a, 304b. The slider spreader 108 also can be formed from multiple components that are attached to each other to create the desired configuration for the slider spreader 108.

Figures 7A, 7B:
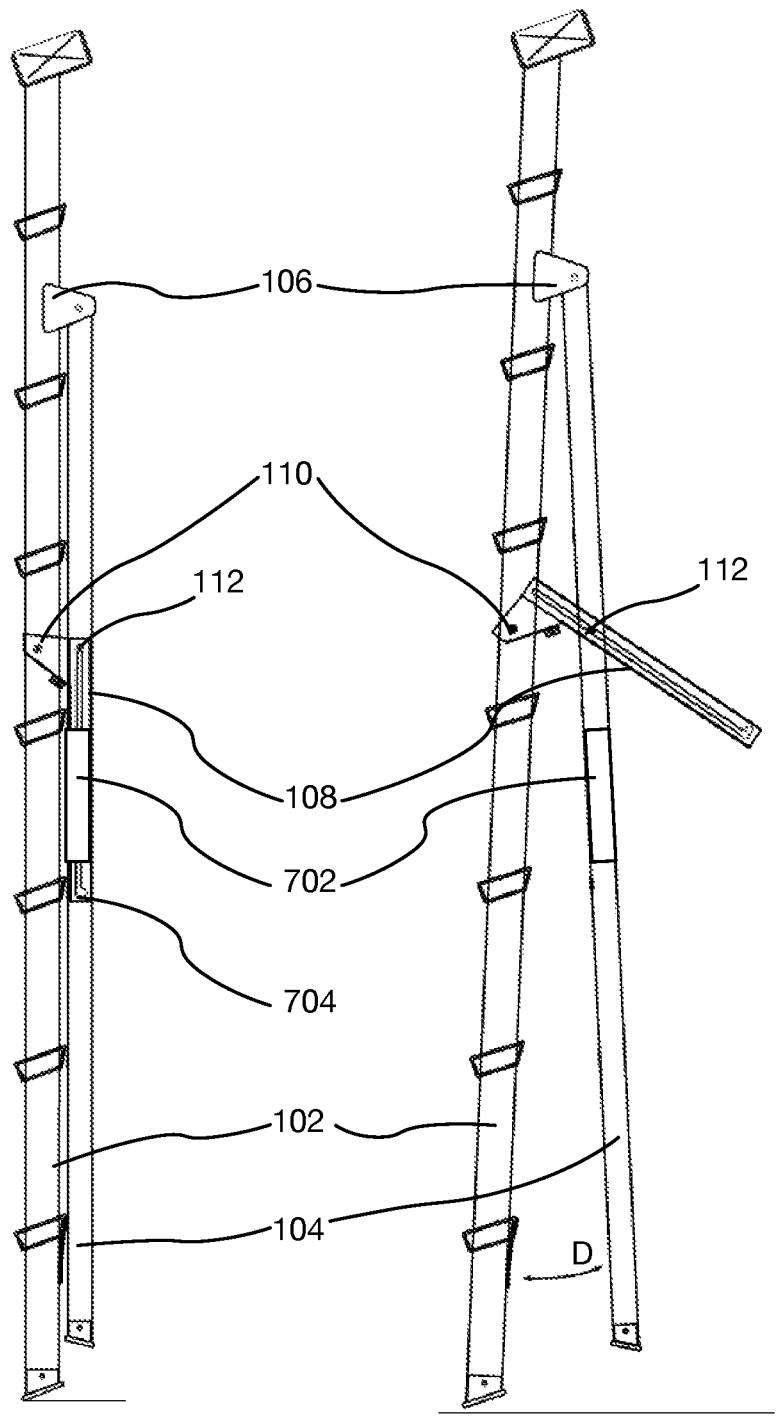
FIGS. 7A-7E are side views depicting operation of slider spreaders to open legs of a ladder, illustrating sequential opening of the ladder from a closed position depicted in FIG. 7A, through intermediate positions depicted in FIGS. 7B-7D, to an open position depicted in FIG. 7E.
Figure 7C:
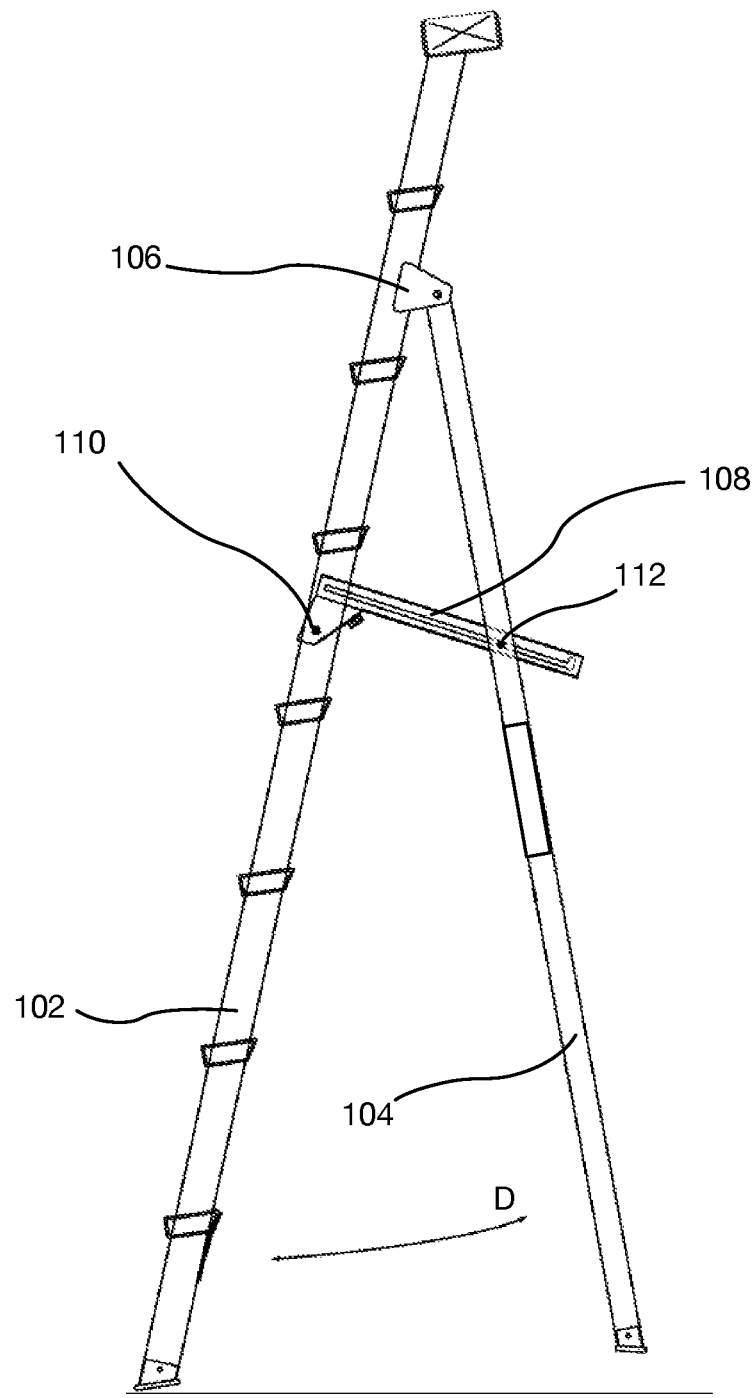
Figure 7D:
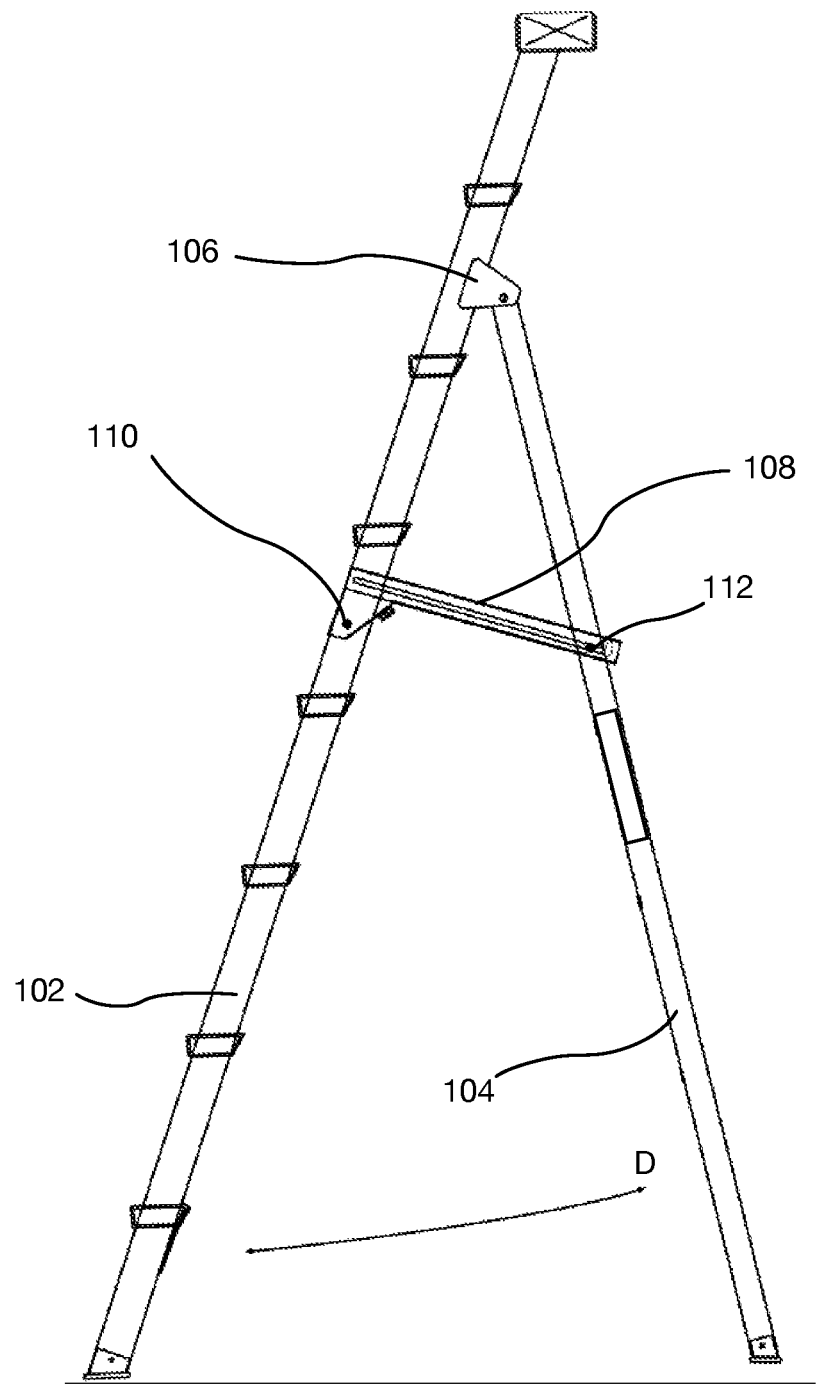
Figure 7E:
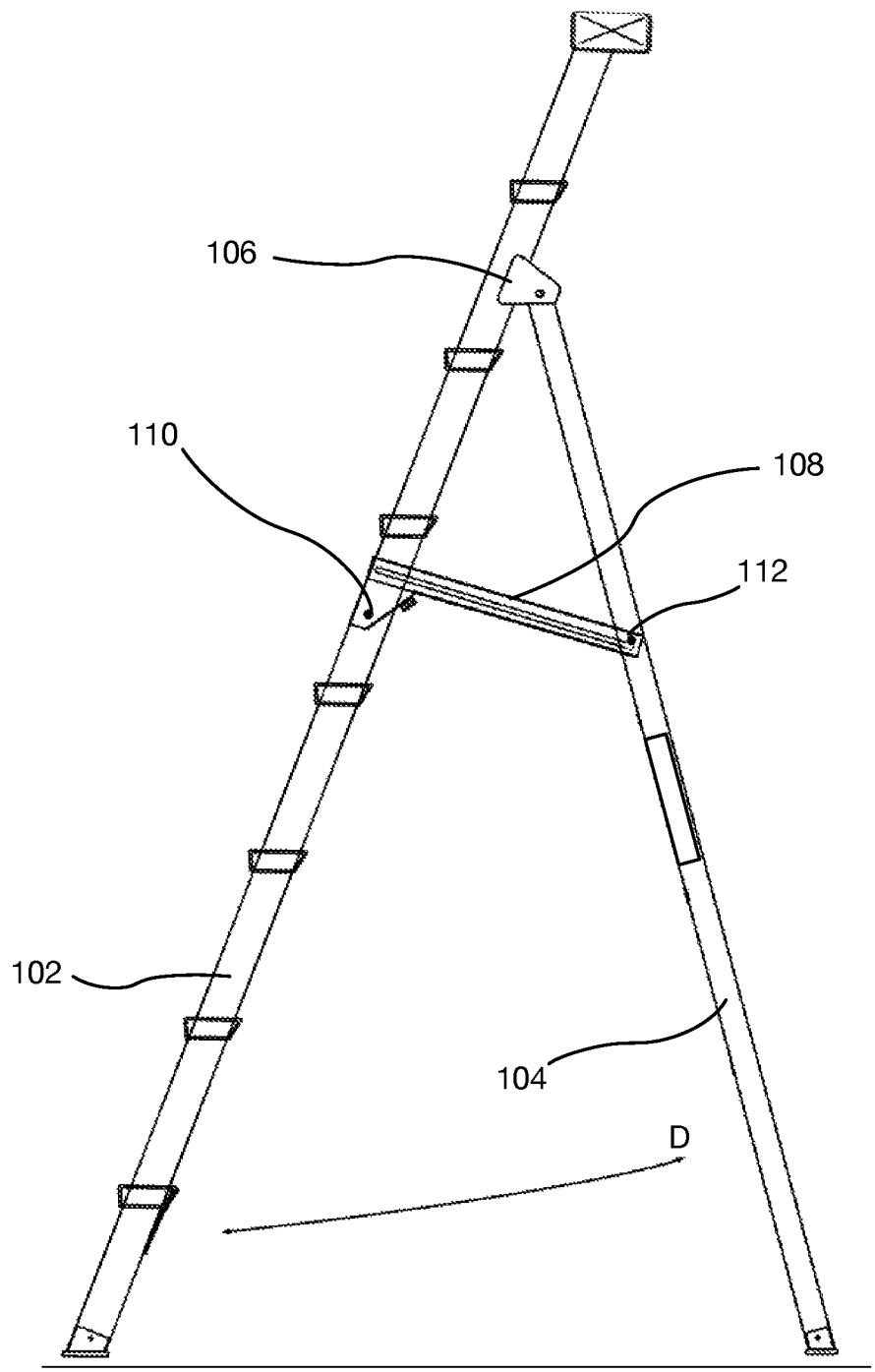

FIGS. 7A-7E are side views depicting operation of the slider spreaders 108 to open the legs 102, 104 of the ladder 100, illustrating sequential opening of the ladder 100 from a closed position depicted in FIG. 7A, through intermediate positions depicted in FIGS. 7B-7D, to an open position depicted in FIG. 7E. For ease of illustration, the ladder 100 depicted in FIGS. 7A-7E has slider spreaders 108 disposed on an exterior of the legs 102, 104 of the ladder 100.

The ladder 100 starts in the closed position illustrated in FIG. 7A in which the legs 102, 104 of the ladder 100 are closed. In the closed position, the slider spreader 108 is pivoted around the front attachment mechanism 110 such that the rear attachment mechanism 112 has slid toward an end of the slot 304a near the front attachment mechanism 110. As depicted in FIG. 7A, the front and rear attachment mechanisms 110, 112 are disposed at substantially the same height above the ground along the legs 102, 104 of the ladder 100 in the closed position.

In operation, to open the ladder 100, the user manipulates the front elongated portion 302 (for example, via the handle 306) such that the rear attachment mechanism 112 slides within the slot 304 as the rear legs 104 of the ladder 100 move in the direction D away from the legs 102 of the ladder 100, as the slider spreader 108 rotates around the front attachment mechanism 110. When the legs 102, 104 reach the maximum spread and the rear attachment mechanism 112 reaches the end of the slot 304a away from the front elongated portion 302, the rear attachment mechanism 112 engages into the latching opening 304b (if provided) of the slot 304a to secure the legs 102, 104 of the ladder 100 in the open position, as depicted in FIG. 7E.

Closing the ladder 100 is illustrated by sequentially viewing FIGS. 7E to 7A. To close the ladder 100, the user manipulates the front elongated portion 302 (for example, via the handle 306) such that the rear attachment mechanism 112 disengages from the latching opening 304b of the slot 304a and slides within the slot 304a toward the front elongated portion 302 as the rear legs 104 of the ladder 100 move toward the legs 102 of the ladder 100, and as the slider spreader 108 rotates around the front attachment mechanism 110. When the rear legs 104 reach the closed position next to the legs 102, the slot 304a extends substantially in the direction along the legs 102, 104, thereby retaining the rear attachment mechanism 112 in the closed position to hold the legs 102, 104 of the ladder 100 together.

Magnets 114 (see FIG. 1B) may be attached to one or more cross supports 105 and positioned to contact the rear end of the slider spreaders 108 when the ladder is in the closed position. For example, magnets 114 may be placed on cross supports 105 at locations 704 illustrated in FIG. 7A. In this manner, magnetic attraction between the magnets 114 and the rear ends of the slider spreaders 108 can assist in holding the slider spreaders 108 (and therefore the ladder 100) in the closed position.

The slider spreader described herein can be formed from any suitable material, such as metals, wood, plastics, or others suitable materials or combinations thereof. Materials can be chosen to provide desired strength, functionality, weight, or other design parameters.

A ladder may include one slider spreader attached to two legs of the ladder, for example, and front leg 102 and rear leg 104 of the ladder 100. The ladder also may include a slider spreader attached to the opposite front leg 102 and rear leg 104 of the ladder. The innovations are described herein with the front elongated portion 302 of the slider spreader 108 being connected to the front leg 102 of the ladder 100 and the rear elongated portion 304 of the slider spreader 108 being connected to the rear leg 104 of the ladder 100. However, this configuration may be switched whereby the front elongated portion 302 of the slider spreader 108 is connected to the rear leg 104 of the ladder 100 and the rear elongated portion 304 of the slider spreader 108 is connected to the front leg 102 of the ladder 100.

FIGS. 1A, 1B, 2A, and 2B depict a ladder 100 with slider spreaders 108 disposed on an interior of the legs 102, 104 of the ladder 100, with the handles 306 extending toward an interior of the ladder 100. However, the slider spreaders 108 may be disposed on an exterior of the legs 102, 104 of the ladder 100, with the handles 306 extending toward an exterior of the ladder 100. In this case, a shield (see item 702 in FIGS. 7A-7E) may be provided along the exterior of the front legs 102 to protect the rear elongated portion of the slider spreader 108 during storage and transportation.

The slider spreaders described herein are designed to attach to any ladder having two legs that fold apart or together via a hinge point. For example, the slider spreaders described herein can replace a conventional hinge spreader on a common step ladder and may be positioned on either the inside or outside of the front step and rear support legs of the ladder to set the proper open-spread width of folding ladder legs.

The slider spreaders allow the user to spread open or to close the legs of the ladder more easily than conventional folding step ladder spreaders. The user can stand in the same position (on step side) to throw open or pull closed the legs of the folding ladder. The user doesn't have to reach around to unlock the open spreader like on the conventional folding step ladders with hinged spreaders. The user also does not have to manually push or pull the legs of the ladder apart or towards each other to open/close the ladder like with conventional folding step ladders with hinged spreaders. Although, the user may push or pull the legs of the ladder operate the slider spreaders, if desired, instead of using the provided handles.

The slider spreader is less likely to be a pinched-finger hazard because of the location of the user's hands on the slider spreader's handles when opening and closing the ladder, as compared to a conventional hinge spreader which typically requires the user's hands placed between the legs to operate.

The slider spreader can allow the user to spread open or close the legs of the ladder faster than conventional folding ladder spreaders. The slider spreader also locks the legs together when closed for easier transporting or carrying of the ladder. The slider spreader also locks the legs apart when open for more security of the ladder in use.

The example systems, methods, and components described in the embodiments presented previously are illustrative, and, in alternative embodiments, certain components can be combined in a different order, omitted entirely, and/or combined between different example embodiments, and/or certain additional components can be added, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

The invention claimed is:

1. A ladder, comprising:
   two front legs comprising a first front leg and a second front leg, each front leg comprising a length;
   a plurality of rungs spaced along the length of the two front legs and separating the two front legs, each rung comprising a first end and a second end and having the first end of the rung connected to the first front leg and the second end of the rung connected to the second front leg;
   two rear legs comprising a first rear leg and a second rear leg, the first rear leg being hingeably coupled to the first front leg, and the second rear leg being hingeably coupled to the second front leg; and
   a slider spreader comprising a base, a track, and a handle,
      the track coupled to and extending away from the base,
      the base rotatably coupled to an inside of the first front leg,
      the track slidably coupled to an inside of the first rear leg, and
      the handle affixedly coupled to and extending away from the base toward an inside of the ladder in a plane that is different from a plane in which the base and the track are disposed; the handle being positioned between the first and second front legs; the handle being configured such that a user can grab and operate the handle to open and close the ladder.

2. The ladder according to claim 1, further comprising:
   a first pin that rotatably couples the base to the first front leg; and
   a second pin that slidably couples the track to the first rear leg.

3. The ladder according to claim 2, wherein, when the ladder is in a closed position and standing vertically, the first pin is disposed on the first front leg in a horizontal relationship to the second pin disposed on the first rear leg.

4. The ladder according to claim 1, the base comprising an aperture therein, wherein the base is rotatably coupled to the first front leg via the aperture in the base.

5. The ladder according to claim 4, the aperture located toward a first end of the base, and the track connecting to the base toward a second end of the base that is opposed to the first end of the base.

6. The ladder according to claim 1, the track comprising a slot therein, wherein the track is slidably coupled to the first rear leg via the slot in the track.

7. The ladder according to claim 6, the slot extending along at least a portion of a length of the track in a direction that is parallel to an edge of the track.

8. The ladder according to claim 6, the slot extending along at least a portion of a length of the track in a direction that is offset from parallel to an edge of the track.

9. The ladder according to claim 6, the slot comprising a latch portion disposed at an end of the slot that is opposite the base, the latch portion comprising an extension of the slot in a direction that is orthogonal to the slot.

10. The ladder according to claim 6, the slot comprising a latch portion disposed at an end of the slot that is opposite the base, the latch portion comprising an extension of the slot in a direction that is offset from orthogonal to the slot.

11. The ladder according to claim 1, wherein the handle extends orthogonally away from the base.

12. The ladder according to claim 1, wherein the base, the track, and the handle are integrally formed from a single piece of material.

13. The ladder according to claim 1, further comprising:
   a support comprising a first end and a second end and having the first end of the support connected to the first rear leg and the second end of the support connected to the second rear leg; and
   a magnet coupled to the support and disposed in a position to engage the track when the ladder is in a closed position.

14. A ladder, comprising:
   two front legs comprising a first front leg and a second front leg, each front leg comprising a length;
   a plurality of rungs spaced along the length of the two front legs and separating the two front legs, each rung comprising a first end and a second end and having the first end of the rung connected to the first front leg and the second end of the rung connected to the second front leg;
   two rear legs comprising a first rear leg and a second rear leg, the first rear leg being hingeably coupled to the first front leg, and the second rear leg being hingeably coupled to the second front leg;
   a slider spreader comprising a first elongated portion, a second elongated portion, and a handle,
      the second elongated portion coupled to and extending away from the first elongated portion,
      the first elongated portion comprising an aperture therein,
      the second elongated portion comprising a slot that extends along at least a portion of a length of the second elongated portion and into the first elongated portion, and
      the handle affixedly coupled to and extending away from the first elongated portion toward an inside of the ladder in a plane that is different from a plane in which the first elongated portion and the second elongated portion are disposed; the handle being positioned between the first and second front legs; the handle being configured such that a user can grab and operate the handle to open and close the ladder;
   a first attachment mechanism positioned in the aperture of the first elongated portion of the slider spreader and coupled to an inside of the first front leg of the ladder to rotatably attach the first elongated portion of the slider spreader to the inside of the first front leg of the ladder; and
   a second attachment mechanism positioned in the slot of the second elongated portion of the slider spreader and coupled to an inside of the first rear leg of the ladder to slidably attach the second elongated portion of the slider spreader to the inside of the first rear leg of the ladder.

15. The ladder according to claim 14, the aperture of the first elongated portion being located toward a first end of the first elongated portion, and the slot of the second elongated portion extending into the first elongated portion toward a second end of the first elongated portion that is opposed to the first end of the first elongated portion.

16. The ladder according to claim 14, wherein the slot extends along the at least a portion of the length of the second elongated portion in a direction that is offset from parallel to an edge of the second elongated portion.

17. The ladder according to claim 14, the slot comprising a latching opening disposed at an end of the slot that is opposite the first elongated portion, the latching opening extending away from the slot in a direction that is orthogonal to the slot.

18. The ladder according to claim 14, the slot comprising a latching opening disposed at an end of the slot that is opposite the first elongated portion, the latching opening extending away from the slot in a direction that is offset from orthogonal to the slot.

19. The ladder according to claim 14, wherein the handle extends orthogonally away from the first elongated portion.

20. The ladder according to claim 14, wherein, when the ladder is in a closed position and standing vertically, the first attachment mechanism is disposed on the first front leg in a horizontal relationship to the second attachment mechanism disposed on the first rear leg.

21. The ladder according to claim 14, further comprising:
a support comprising a first end and a second end and having the first end of the support connected to the first rear leg and the second end of the support connected to the second rear leg; and
a magnet coupled to the support and disposed in a position to engage the second elongated portion when the ladder is in a closed position.

\* \* \* \* \*